(12) United States Patent
Cai et al.

(10) Patent No.: US 8,480,781 B2
(45) Date of Patent: Jul. 9, 2013

(54) CEMENT CONTAINING MULTI-MODAL FIBERS FOR MAKING THERMAL SHOCK RESISTANT CERAMIC HONEYCOMB STRUCTURES

(75) Inventors: Jun Cai, Midland, MI (US); Aleksander J. Pyzik, Midland, MI (US); Michael T. Malanga, Clarkston, MI (US); Kwanho Yang, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 14 days.

(21) Appl. No.: 13/380,845

(22) PCT Filed: Jun. 24, 2010

(86) PCT No.: PCT/US2010/039838
§ 371 (c)(1),
(2), (4) Date: Dec. 25, 2011

(87) PCT Pub. No.: WO2011/088462
PCT Pub. Date: Jan. 20, 2011

(65) Prior Publication Data
US 2012/0110965 A1    May 10, 2012

Related U.S. Application Data

(60) Provisional application No. 61/221,434, filed on Jun. 29, 2009.

(51) Int. Cl.
*B01D 39/14* (2006.01)
*B01D 39/06* (2006.01)
*B01D 24/00* (2006.01)
*B01D 50/00* (2006.01)

(52) U.S. Cl.
USPC ............... 55/523; 55/522; 55/524; 422/169; 422/170; 422/171; 422/172; 422/177; 422/178; 422/179; 422/180; 422/181; 422/182

(58) Field of Classification Search
USPC ............. 55/522–524; 422/169–172, 177–182
See application file for complete search history.

(56) References Cited

U.S. PATENT DOCUMENTS 5,914,187 A    6/1999  Naruse
6,071,613 A    6/2000  Rieder
(Continued)

FOREIGN PATENT DOCUMENTS

EP    1997789 A    12/2008
EP    1997790 A    12/2008
(Continued)

*Primary Examiner* — Amber Orlando
(74) *Attorney, Agent, or Firm* — Gary C Cohn PLLC

(57) ABSTRACT

A ceramic honeycomb structure comprised of at least two separate smaller ceramic honeycombs that have been adhered together by a cement comprised of inorganic fibers and a binding phase wherein the smaller honey-combs and fibers are bonded together by the binding phase which is comprised of an silicate, aluminate or alumino-silicate. The fibers have a multi-modal size distribution in which some fibers have lengths of up to 1000 micons and other fibers have lengths in excess of 1 mm. The cement composition may be made in the absence of other inorganic and organic additives while achieving a shear thinning cement, for example, by mixing oppositely charged inorganic binders in water together so as to make a useful cement composition for applying to the smaller honeycombs to be cemented.

12 Claims, 4 Drawing Sheets

U.S. PATENT DOCUMENTS

| | | | |
|---|---|---|---|
| 7,897,238 B2 * | 3/2011 | Ohno et al. | 428/116 |
| 8,053,054 B2 | 11/2011 | Iwata | |
| 2005/0180898 A1 * | 8/2005 | Yamada | 422/180 |
| 2006/0213163 A1 * | 9/2006 | Taoka et al. | 55/523 |
| 2007/0111878 A1 | 5/2007 | Zuberi | |
| 2009/0011178 A1 | 1/2009 | Masukawa | |
| 2009/0029104 A1 | 1/2009 | Iwata | |
| 2009/0239030 A1 | 9/2009 | Cai et al. | |
| 2011/0067864 A1 * | 3/2011 | Reddy et al. | 166/285 |

FOREIGN PATENT DOCUMENTS

| | | |
|---|---|---|
| JP | 09-295877 A | 11/1997 |
| WO | 00-26452 A | 5/2000 |
| WO | 2009-117580 A | 9/2009 |

* cited by examiner

CEMENT CONTAINING MULTI-MODAL FIBERS FOR MAKING THERMAL SHOCK RESISTANT CERAMIC HONEYCOMB STRUCTURES

This application claims priority from U.S. Provisional Application No. 61/221,434, filed 29 Jun. 2009.

The present invention relates to ceramic filters having improved thermal shock resistance and a method to make them. In particular, the filter and method relate to the use of an improved ceramic cement for assembling ceramic particulate filters together to make a larger thermal shock resistant filter.

Diesel engines, because of the way they operate, emit soot particles, very fine droplets of condensate or a conglomerate of the two (particulates) as well as typical harmful gasoline engine exhausts (i.e., hydrocarbons and CO). These "particulates" (herein Diesel soot) are rich in condensed, polynuclear hydrocarbons, some of which may be carcinogenic.

As the awareness of the danger Diesel soot presents to health collides with the need for greater fuel efficiency that Diesel engines provide, regulations have been enacted curbing the amount of Diesel soot permitted to be emitted. To meet these challenges, soot filters have been used. When using such a filter, the filter must be periodically regenerated by burning off the soot. This burning of soot results in stresses from axial and radial temperature differences that can cause cracking of the filter.

To overcome stresses ceramic honeycombs such as heat exchangers and filters have reduced the stresses and potential for cracking the honeycombs by assembling smaller honeycombs into larger honeycombs. Cements layers between the honeycombs have been used, for example, to increase the thermal conductivity to reduce the ultimate temperature reached in the assembled honeycomb such as described by EP 1508355. To achieve the improved thermal conductivity, these cements/sealing layers/adhesives have used ceramic particulates to increase the thermal mass/conductivity and ease of application to the smaller honeycomb segments. Often such cements are augmented by the use of the ceramic fibers, ceramic binders and organic binder such as described by U.S. Pat. No. 5,914,187 to facilitate application of the cement prior to firing (e.g., reduce segregation of particulates) and improve some mechanical property such as toughness of the cement.

Unfortunately, the use of these augmenting materials results in problems in using the cement or reduced effectiveness. For example, an organic binder must be removed from the cement, slowing the process to make the part and also risking damage due to thermal gradients due to combustion of the organics and pressure from evolving gases. Prior attempts to use fibers in the cement tended to lower the thermal mass and thermal conductivity of the cement layer due to inefficient packing and inability to load the fibers to any great extent into a carrier fluid without excessive viscosity increases. Viscosity is an important characteristic of the cement composition, as the composition must be thin enough to be applied easily but viscous enough that it remains in place after it is applied, without running off of the part.

Therefore, it would be desirable to provide an assembled larger honeycomb made up of smaller ceramic honeycombs cemented together. It would be desirable to provide a method making such an assembled larger honeycomb structure which avoids one or more problems described above.

One aspect of the invention is a method of forming a honeycomb structure comprising contacting a first honeycomb segment on at least one of its outer surfaces with a cement composition comprised of inorganic fibers, a carrier fluid and a colloidal inorganic sol, wherein the fibers constitute at least about 10% by weight of the solids of the cement composition and the fibers have a multi-modal length distribution such that a portion of the fibers have lengths of at least 10 microns up to 1000 microns, and at least one other portion of the fibers are longer fibers having lengths of greater than 1 millimeter, preferably from greater than 1 to 100 millimeters, more preferably from 2 to 100 millimeters and even more preferably from 5 to 30 millimeters, mechanically contacting a second honeycomb segment with the first honeycomb segment such that the cement composition is interposed between said honeycomb segments such that said honeycomb segments are adhered, and firing the adhered segments sufficiently to convert the colloid to a binding phase that bonds the fibers of the cement together and bonds the cement to the honeycomb segments to form the honeycomb structure.

The longer fibers preferably constitute from 1 to 50, more preferably from 3 to 30 and even more preferably from 5 to 25 percent of the total weight of the inorganic fibers. Mixed length fibers provide certain advantages. The presence of a minor proportion of longer fibers tends to increase the viscosity of the cement composition, at a given fiber content in the cement. The viscosity of the cement composition should be somewhat high, but not excessively so, so it can be applied and shaped readily without sagging or flowing off of the honeycomb before it can dry. The presence of a minor proportion of longer fibers can allow a good working viscosity to be achieved without unduly increasing the fiber content. If the overall fiber content becomes too high, there may not be enough colloidal silica and/or colloidal alumina in the composition to adequately bind the fibers to each other or to the honeycomb segments. In prior art cement compositions, the strength of the cement tends to decrease with increasing fiber length, because the number of fibers decreases as their length increases (at a given fiber loading), and fewer fibers means fewer points of intersection where they can be bound together. However, when a mixture of shorter and longer fibers is used, as in this invention, the strength of the cement is often more comparable to that of a cement that contains the same weight of only short fibers. Thus, a mixture of shorter fibers and a minor proportion of longer fibers can provide significant processing benefits with few or no corresponding disadvantages.

In another aspect, this invention is a cement composition comprising inorganic fibers, a carrier fluid and a colloidal inorganic sol, wherein the fibers constitute at least about 10% by weight of the solids of the cement composition and the fibers have a multi-modal length distribution wherein a portion of the fibers have lengths of at least 10 microns up to 1000 microns, and at least one other portion of the fibers are longer fibers having lengths of at least 1 millimeter.

In a further aspect, the invention is a ceramic honeycomb structure comprised of at least two separate smaller ceramic honeycombs that have been adhered together by the method of the first aspect.

The ceramic honeycomb structures may be used in any applications requiring resistance to hot gases or liquids such as heat exchangers, catalyst supports and filters (for example, molten metal and soot filters). The cement may be used to make porous ceramics requiring improved thermal shock resistance such as the aforementioned honeycomb structures.

Figure 1:
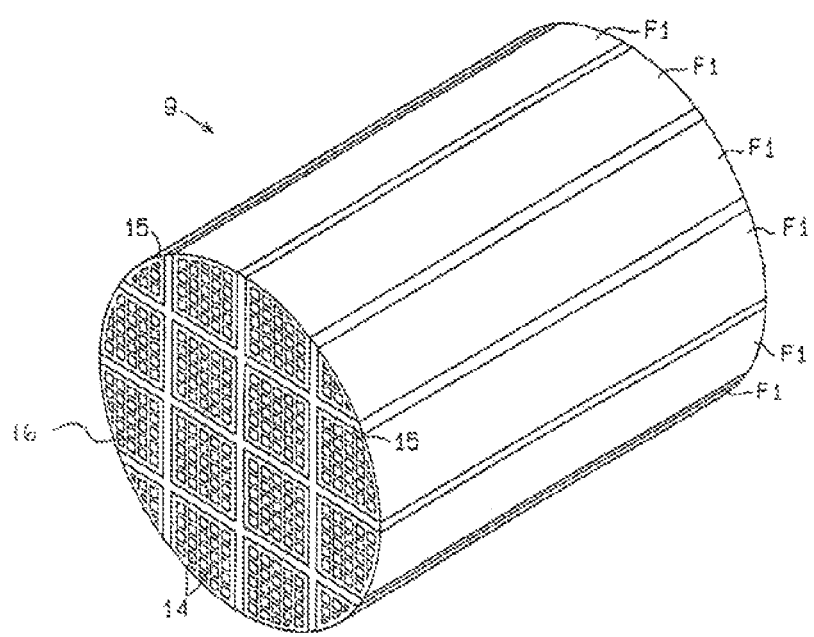
FIG. 1 is a perspective view of a honeycomb structure of this invention.

Turning to FIG. 1, there is shown a honeycomb structure 9 made up of segments F1 joined together by cement layers 15. Honeycomb segments F1 have axially-extending cells 14 which are defined by intersecting walls 16.

The smaller ceramic honeycombs F1 (i.e., honeycomb segments) may be any suitable porous ceramic, for example, such as those known in the art for filtering Diesel soot. Exemplary ceramics include alumina, zirconia, silicon carbide, silicon nitride and aluminum nitride, silicon oxynitride and silicon carbonitride, mullite, cordierite, beta spodumene, aluminum titanate, strontium aluminum silicates, lithium aluminum silicates. Preferred porous ceramic bodies include silicon carbide, cordierite and mullite or combination thereof. The silicon carbide is preferably one as described in U.S. Pat. Nos. 6,669,751B1, EP1142619A1 or WO 2002/070106A1. Other suitable porous bodies are described by U.S. Pat. Nos. 4,652,286; 5,322,537; WO 2004/011386A1; WO 2004/011124A1; U.S. 2004/0020359A1 and WO 2003/051488A1.

A mullite honeycomb preferably has an acicular microstructure. Examples of such acicular mullite ceramic porous bodies include those described by U.S. Pat. Nos. 5,194,154; 5,173,349; 5,198,007; 5,098,455; 5,340,516; 6,596,665 and 6,306,335; U.S. Patent Application Publication 2001/0038810; and International PCT publication WO 03/082773.

The ceramic making up the honeycomb segments F1, generally, has a porosity of about 30% to 85%. Preferably, the porous ceramic has a porosity of at least about 40%, more preferably at least about 45%, even more preferably at least about 50%, and most preferably at least about 55% to preferably at most about 80%, more preferably at most about 75%, and most preferably at most about 70%.

The segments F1 in the honeycomb structure 9 may be any useful amount, size, arrangement, and shape such as those well known in the ceramic heat exchanger, catalyst and filter art with examples being described by U.S. Pat. Nos. 4,304,585; 4,335,783; 4,642,210; 4,953,627; 5,914,187; 6,669,751; and 7,112,233; EP 1508355; 1508356; 1516659 and Japanese Patent Publ. No. 6-47620. In addition, the segments F1 may have channels 14 with any useful size and shape as described in the just mentioned art and U.S. Pat. Nos. 4,416676 and 4,417,908. The thickness of the walls 16 may be any useful thickness such as described in the aforementioned and U.S. Pat. No. 4,329,162.

The thickness of the cement layer 15 may be any useful thickness such as described in the art of the first sentence of the previous paragraph. A cement layer may be continuous or discontinuous (an example of a discontinuous layer being described in U.S. Pat. No. 4,335,783). Typically, the thickness of the cement layer 15 is from about 0.1 mm to about 10 mm. The thickness of the layer may be at least 0.2, 0.5, 0.8 or 1 mm to at most about 8, 6, 5, 4 or 3 mm.

The cement layer may have a porosity that varies widely, but it is generally between about 20% to 90% porous. Typically, the porosity is at least about 25%, 30%, 35%, 40%, 45% or 50% to at most about 85%, 80%, 75% or 70%.

The segments F1 are adhered together by the cement 15. The cement 15 is comprised of inorganic fibers bonded together with a binding phase. The fibers have a multi-modal length distribution wherein a portion of the fibers have lengths of at least 10 microns up to 1000 microns, and at least one other portion of the fibers are longer fibers having lengths of at least 1 millimeter, preferably from 1 to 100 millimeters, more preferably from 2 to 100 millimeters and even more preferably from 5 to 30 millimeters.

By "multi-modal", it is meant that the lengths of the individual fibers fall into two or more discrete ranges of sizes. Thus, when the number of fibers is plotted against fiber length, the resulting plot will exhibit at least two maxima, which are separated by a minimum that represents a range of fiber lengths in which there are few or no fibers.

The longer fibers preferably constitute from 1 to 50, more preferably from 3 to 30 and even more preferably from 5 to 25 percent of the total weight of the inorganic fibers.

Generally, the fiber diameter of the fibers is from about 0.1 micrometer to about 20 micrometers. The fiber diameter may be at least about 0.2, 0.4, 0.6, 0.8, 1, 2 or 4 micrometers to at most about 18, 15, 12, 10 or 8 micrometers.

The fibers may be any useful inorganic fibers such as those known in the art. The fiber may be amorphous or crystalline or partly amorphous and partly crystalline. The fiber may be amorphous to start and upon heating or use during operation, for example, in a Diesel particulate trap, crystallize to some extent such as described in U.S. Pat. No. 5,322,537. The fiber may be an amorphous silicate or aluminosilicate fiber that may be crystallized to form or have, for example, mullite crystals within the fiber and surrounded by glass. A silicate or aluminosilicate fiber may also contain other compounds such as rare earths, zirconium or alkaline earths in significant amounts (i.e., greater than 1% by mole and preferably at least about 2%, 3%, 4%, 5%, 7%, or 10% to at most about 40% by mole). Particular examples are aluminosilicate fibers available under the tradename FIBERFRAX, from Unifrax LLC, Niagara Fall, N.Y.; alkaline earth fiber (Mg-silicate fiber) under the tradename ISOFRAX also available from Unifrax and SAFFIL (e.g., SAFFIL RF) alumina fibers available from Saffil LTD. Cheshire, UK.

In a particular embodiment, the fiber is an alkaline earth alumino silicate, alkaline earth silicate or combination thereof. In particular the alkaline earth is Mg, Ca or combination thereof. Preferably the fiber is a silicate of Mg, Ca or combination thereof. Even more preferably the fiber is a Mg-silicate such as the ISOFRAX materials described above.

The cement composition may contain low aspect ratio inorganic filler particles in addition to the inorganic fibers described above. These inorganic filler particles are different from and do not include the colloidal silica and/or colloidal alumina component of the skin-forming composition. The inorganic filler particles do not form a binding phase when the skin-forming composition is dried. The inorganic filler particles instead retain their particulate nature throughout the drying process, although they may become bound by the binding phase to other particles or to the inorganic fibers. "Low aspect ratio" refers to an aspect ratio of less than 10, preferably less than 5.

These low aspect ratio inorganic filler particles can be, for purposes of this invention, classified into two types. The first type is particles that have the same CTE or very nearly the same CTE (i.e., within about 1 ppm/° C. in the temperature range from 100-600° C.) as the inorganic fiber, after the firing step is completed. The comparison is performed on the basis of the fired cement to account for changes in CTE that may occur to the fibers and/or other particles during the firing step, due to, for example, changes in crystallinity and/or composition that may occur. Particles of this type generally have the same or nearly the same chemical composition as the inorganic fiber. A common source of this type of particle is so-called "shot" material, which is a by-product of some fiber manufacturing processes and is present in many commercial grades of inorganic fibers. However, this type of inorganic filler particle may be supplied from other sources as well.

The second type of inorganic filler particles have a CTE which is significantly different (i.e., different from that of the inorganic fibers by greater than 1 ppm/° C., more preferably at least 2 ppm/° C. in the temperature range from 100 to 600° C.) than that of the inorganic fibers, after the firing step is completed. One advantage of this invention is that it is not necessary to add fillers or otherwise attempt to "match" the coefficient of thermal expansion of the cement to that of the underlying honeycomb. Examples of this second type of inorganic filler particles are alumina, silicon carbide, silicon nitride, mullite, cordierite and aluminum titanate.

In making the honeycomb structure of this invention, a cement composition is made by forming a mixture containing the fibers described above, a colloidal solid, typically a carrier fluid and optionally other materials, including low aspect ratio fillers as described above. To achieve the desired size and distributions of fibers, the fibers are first comminuted if necessary by any suitable means such as ball/pebble milling, attrition, jet milling or the like at conditions readily determined by one of ordinary skill in the art for the particular technique.

Illustratively, commercially available fibers such as FIBERFRAX or ISOFRAX described above are milled dry in a ball mill using ceramic media such as zircon, alumina, quartz pebbles, zirconia or any other milling media that would not introduce detrimental impurities.

The fibers of the proper length are then typically mixed with colloidal inorganic particles in a carrier fluid to make the cement composition.

Colloid herein means a particulate having an average particle size of less than 1 micrometer, preferably less than 250 nm, by number. The colloid may be crystalline or amorphous. Preferably, the colloid is amorphous. The colloid is preferably a silicate, aluminate or aluminosilicate sol. Desirably, the colloid is a cation (alkali or ammonium) stabilized silicate sol, which are commonly referred to as silica colloids or silica sols that have a basic pH. The surface charge of these silica colloids is negative as determined by known electrophoretic techniques. When the sol is an alumina sol/colloid, it desirably is a sol having an acidic pH, where the alumina particles have a positive charge as determined by electrophoretic techniques. Illustrative colloids include those known in the art, such as those available under the tradenames such as KASIL and N, PQ Corporation, PO Box 840, Valley Forge, Pa.; ZACSIL, Zaclon Incorporated, 2981 Independence Rd., Cleveland, Ohio; Sodium Silicates, Occidental Chemical Corporation, Occidental Tower, 5005 LBJ Freeway, Dallas, Tex.; NYACOL Nexsil colloidal silica and Al2O colloidal aluimina, Nyacol Nanotechnologies Inc., Ashland Mass. and Aremco 644A and 644S, Aremco Products Inc., Valley Cottage, N.Y.

In a particular embodiment, the segments are mullite and the colloids used to form the cement are a mixture of silica and alumina. Illustratively, when a mixture of silica and alumina sols are used, the weight ratio of the silica to alumina of the colloidal sols may be any useful ratio such as 1:99 to 99:1. Desirably the ratio is 5:95, 10:90, 20:80: 30:70, 40:60, or 50:50 or their inverses.

The carrier liquid may be, for example, water or any organic liquid. Suitable organic liquids include alcohols, glycols, ketones, ethers, aldehydes, esters, carboxylic acids, carboxylic acid chlorides, amides, amines, nitriles, nitro compounds, sulfides, sulfoxides, sulfones, and the like. Hydrocarbons, including aliphatic, unsaturated aliphatic (including alkenes and alkynes) and/or aromatic hydrocarbons, are useful carriers. Organometallic compounds are also useful carriers. Preferably, the carrier fluid is water, an aliphatic, alkene or alcohol. More preferably, the liquid is an alcohol, water or combination thereof. When an alcohol is used it is preferably methanol, propanol, ethanol or combinations thereof. Most preferably, the carrier fluid is water.

The cement composition may contain other useful components, such as those known in the art of making ceramic cements. Examples of other useful components include dispersants, deflocculants, flocculants, plasticizers, defoamers, lubricants and preservatives, such as those described in Chapters 10-12 of Introduction to the Principles of Ceramic Processing, J. Reed, John Wiley and Sons, NY, 1988. When an organic plasticizer is used, it desirably is a polyethylene glycol, fatty acid, fatty acid ester or combination thereof.

The cement composition may also contain one or more binders. Examples of binders include cellulose ethers such as those described in Chapter 11 of Introduction to the Principles of Ceramic Processing, J. Reed, John Wiley and Sons, NY, N.Y., 1988. Preferably, the binder is a methylcellulose or ethylcellulose, such as those available from The Dow Chemical Company under the trademarks METHOCEL and ETHOCEL. Preferably, the binder dissolves in the carrier liquid.

The cement composition may also contain one or more porogens. Porogens are materials specifically added to create voids in the dried cement. Typically, these porogens are particulates that decompose, evaporate or in some way volatilize away during the heating to leave a void. Examples include flour, wood flour, carbon particulates (amorphous or graphitic), nut shell flour or combinations thereof.

In a particular embodiment, the cement composition is made in the absence of organic constituents (other than the carrier fluid if the carrier fluid is an organic solvent such as an alcohol). Preferably, when making this cement embodiment the carrier fluid is water. In a preferred embodiment of this invention, the cement composition is made by mixing the fibers with a colloid having a particular surface charge (e.g., a silica colloid having a negative surface charge such as in basic water) within the carrier fluid until a good mixture is formed and then subsequently adding or mixing in a second colloid having an opposite charge (e.g., alumina colloid having a positive surface charge such as in acidic water) to form the cement composition. Surprisingly, this method results in a cement having excellent shear thinning rheology, which limits any segregation of the components of the cement and allows for easy application on the segments by known methods for applying such pastes (e.g., spraying, smearing, puttying, and any other suitable technique involving applying a shear to the paste and contacting it with the outer surface of the segment).

A suitable Brookfield viscosity for the cement composition is at least 15 Pa·s, preferably at least 25 Pa·s, more preferably at least 50 Pa·s at 25° C., as measured using a #6 spindle at a rotational speed of 5 rpm. The Brookfield viscosity under those conditions may be as high as 1000, preferably up to 500 Pa·s, under those conditions.

The fiber should constitute at least 10% by weight of the solids of the cement composition. For purposes of this calculation, the "solids" are constituted by the inorganic materials in the cement composition, including fillers and inorganic binding phase, that remain in the cement after the cement composition is fired. In most cases, the solids will be made up of the inorganic fiber, the colloidal silica and/or colloidal alumina, plus any inorganic filler particles that may be present. Carrier fluids and organic materials generally are lost from the composition during the drying step(s) and are no longer present in the dried skin. Typically the fibers constitute at least 30%, preferably at least 50 percent and more preferably at least 60% by weight of the solids in the cement composition. The fibers preferably constitute no more than 85%, still more preferably no more than 80%, of the weight of the solids.

The colloidal sol particles should constitute up to 70% of the weight of the solids of the cement composition. The sol particles suitably constitute from 10 to 70%, preferably from 15 to 50% and more preferably from 20 to 40% of the weight of the solids in the cement composition.

Low aspect ratio fillers, if present at all, may constitute up to two-thirds of the combined weight of the fibers and low aspect ratio fillers. Preferably, low aspect ratio fillers constitute no more than 25%, still more preferably no more than 15% of the combined weight of the fibers and low aspect ratio fillers. Low aspect ratio fillers of the first type mentioned above (having a CTE close to that of the fibers) may constitute up to two-thirds, preferably up to 25% and more preferably up to 10% of the combined weight of the fibers and low aspect ratio fillers. Low aspect ratio fillers of the second type described above (having a CTE at least 1 ppm/° C. different from that of the fibers) preferably constitute no more than 5% of the solids of the cement composition.

The fibers and low aspect ratio fillers may together constitute from 30 to 90%, preferably from 50 to 85% and still more preferably from 60 to 80% of the weight of the solids in the cement composition.

In one preferred embodiment, the cement composition contains, as fillers, only the inorganic fiber, "shot" material from the inorganic fiber, and optionally the second type of inorganic filler particle, which may be present in an amount from 0 to 5% by weight of the solids of the cement, but essentially no (less than 5 weight percent, preferably no more than 1%) other organic filler particles of the first type.

In another preferred embodiment, the inorganic filler contains only the inorganic fiber and from 0-5 weight percent, based on weight of the solids, of the second type of inorganic filler, but no "shot" material or other inorganic filler of the first type. Accordingly, the cement composition may contain no inorganic filler particles of the second type at all, or may contain only very small proportions thereof, such as, for example, from 0 to 3% or from 0 to 2% or from 0 to 1% of the solids of the cement composition.

The total amount of carrier fluid that is used may vary over a wide range depending on other organic additives such as those described below and the solids loading of the fiber and the technique used to contact the segments together. The total amount of carrier fluid generally is at least about 40% by volume to at most about 90% volume of the cement composition.

After a segment or segments is contacted on its outer surface with the cement composition, the segments are brought together so that the cement composition becomes interposed between the segments. This can be done using any suitable method. The honeycomb segments can be wetted with neat carrier fluid or a colloidal sol prior to applying the cement composition. In the latter case, the colloidal alumina and/or silica can become distributed throughout each of the segments. This surprisingly has been found to be useful in trapping very small liquid and particulate fractions of soot emitted from a Diesel engine. A colloidal sol may be introduced into the segments of the honeycomb structure after the cement composition has been applied and dried. The method used to wet the honeycomb segments may be any suitable technique for applying a fluid, such as dipping, spraying, injecting, brushing or combination thereof. The sol may be any one of those already described herein.

Illustratively, the segments, if having a square cross-section, may be held in a template and the cement composition squirted or injected in the gaps between the segments. The segments have the cement composition deposited onto the desired surface, such as fitting a corner into an inclined plane and building up from this first square in whatever pattern desired. The inclined plane may, if desired have spacers also built in so that the first layer of segments has equidistant spacing resulting in a more uniform cement layer thickness. Alternatively, the segments may be placed on a flat surface and built up in a manner similar to brick masonry.

Once the segments are brought together, the carrier fluid is removed, binders and other organic additives (if any) are burned out and the cement composition is fired to convert the colloid to a binding phase. The carrier fluid can be removed by heating or any suitable method, which may include just ambient evaporation or any other useful method such as those known in the art. The removal of carrier fluid may also occur during the firing step. Binders and other organic additives in the segments or cement are generally removed by heating. This heating method may be any suitable method such as those known in the art. The removal of organic materials may also occur during the firing step. To create the binding phase, the cement is fired at elevated temperature. The temperature should not be so high that the honeycomb structure sags or the binding phase migrates to an extent that is deleterious to the performance of the honeycomb structure. Typically the temperature during the firing step is at least about 600° C., 650° C., 700° C., 750° C. or 800° C. to at most about 1200° C., 1150° C., 1100° C., 1050° C. or 1000° C.

After firing, the cement contains the inorganic fibers described before, a binding phase formed from the colloidal sol, optionally other low aspect ratio fillers as described before. The ratios of these components is essentially the same as were present in the solids of the cement composition. The binding phase is an aluminate, silicate or aluminosilicate. The binding phase may be amorphous, crystalline or partially amorphous and partially crystalline.

Surprisingly, the coefficient of thermal expansion (CTE) of the fired cement of the present invention may be substantially different than that of the honeycomb segments. The CTE of the fired cement may differ from that of the honeycomb segments by more than 1 ppm/° C. or by at least 2 ppm/° C. For example, when the segment is mullite (CTE ~5.5 ppm/° C.) cements of the invention having a CTE of ~8 ppm/° C. (e.g., use of alumina sol as the sole binder with a mg-silicate fiber) are as effective in reducing thermal shock without any degradation to the honeycomb structure as cements with almost matching CTEs. This allows for one cement composition to be used on multiple differing segments and even allows for cementing segments of differing composition and CTE's.

EXAMPLE 1 AND COMPARATIVE SAMPLES A, B AND C 4 parts by weight of an unchopped aluminum zirconium silicate fiber (Fiberfrax Long Staple Fine Fiber, available from Unifrax LLC, length >50 mm, diameter 4-8 microns), 26 parts of a ball milled aluminum zirconium silicate fiber (from Unifrax LLC, length 100-500 microns, diameter 4-8 microns), 16 parts of colloidal alumina (AL20SD, available from Nyacol Nano Technologies, Inc., Ashland, Mass.), 48 parts of water, 3 parts of methyl cellulose and 3 parts of a 400 molecular weight polyethylene glycol are mixed until uniform. The viscosity of the mixture is measured at different rotational speeds using a Brookfield Model RVDV-I Prime viscometer with a No. 6 disc spindle at room temperature. Results are as indicated by line 1 in FIG. 2.

To fabricate 4-point bend samples, two honeycomb segments of about 50 mm×20 mm×7.5 mm are cemented together using the composition, fired to 1100° C., cooled, and tested using an Instron 5543 Load Frame at a controlled speed of 0.02 inch per minute. The upper span is 40 mm and the lower span is 80 mm. Load data is recorded versus displacement. Another portion of the cement composition is cast into blocks, which are fired in the same manner and cooled. Bars 8 mm×4 mm×40 mm are cut from the fired blocks, and the modulus of the dried cement is measured from the bars according to ASTM 1259-98. The modulus of the cement composition is 1.5 GPa. The load-displacement curve of the cement bars on the 4-point bend test is indicated by in FIG. 3.

Comparative Sample A is prepared in the same manner as described with respect to Example 1. The cement composition in this case is 43 parts of a ball milled aluminum zirconium silicate fiber (from Unifrax LLC, length 100-500 microns, diameter 4-8 microns), 13 parts of colloidal alumina (AL20SD, available from Nyacol Nano Technologies, Inc., Ashland, Mass.), 39 parts of water, 2.5 parts of methyl cellulose and 2.5 parts of a 400 molecular weight polyethylene glycol. The resulting cement mixture contains no long fibers. The viscosity of the cement composition is measured in the same manner as for Example 1. Results are indicated by reference numeral A in FIG. 2. 4-point bend testing is performed on test bars made from the cement, as described with respect to Example 1. Results are shown graphically in FIG. 4.

Comparative Sample B is prepared in the same manner as described with respect to Example 1. The cement composition in this case is 27 parts of a ball milled aluminum zirconium silicate fiber (from Unifrax LLC, length 100-500 microns, diameter 4-8 microns), 17 parts of colloidal alumina (AL20SD, available from Nyacol Nano Technologies, Inc., Ashland, Mass.), 50 parts of water, 3.0 parts of methyl cellulose and 3.0 parts of a 400 molecular weight polyethylene glycol. The resulting cement mixture contains no long fibers. The amount of short fibers is approximately the same as in Example 1. The viscosity of the cement composition is measured in the same manner as for Example 1. Results are indicated by reference numeral B in FIG. 2.

Figure 2:
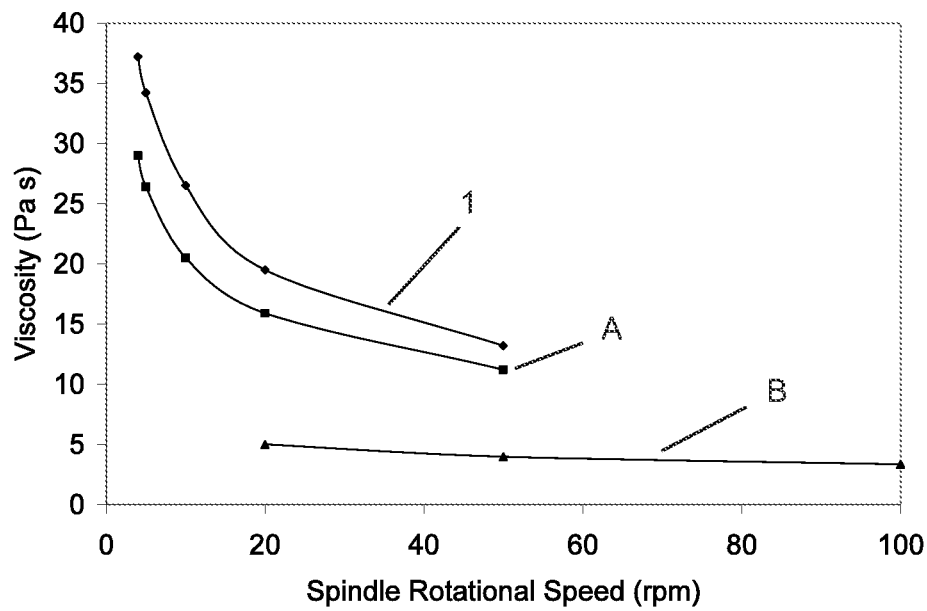
FIG. 2 is graph showing the viscosities of a cement of the invention and of two comparative cement compositions, over a range of spindle rotational speeds.

FIG. 2 shows that the viscosity of Example 1, which contains only 30% by weight of fibers, is slightly greater than that of Comparative Sample A, even though the fiber content of Comparative Sample A is much higher (43%). These results indicate that a workable cement viscosity can be obtained at a lower total fiber loading, if a small proportion of long fibers are present. This allows the overall fiber content to be reduced, which in turn allows for a higher proportion of the inorganic binder (colloidal alumina in this case) to be included in the composition. FIG. 2 also shows the much lower viscosity of Comparative Sample B. Comparative Sample B has an overall fiber content that is approximately equal to that of Example 1, the difference being that Comparative Sample B contains only short fibers.

Figure 3:
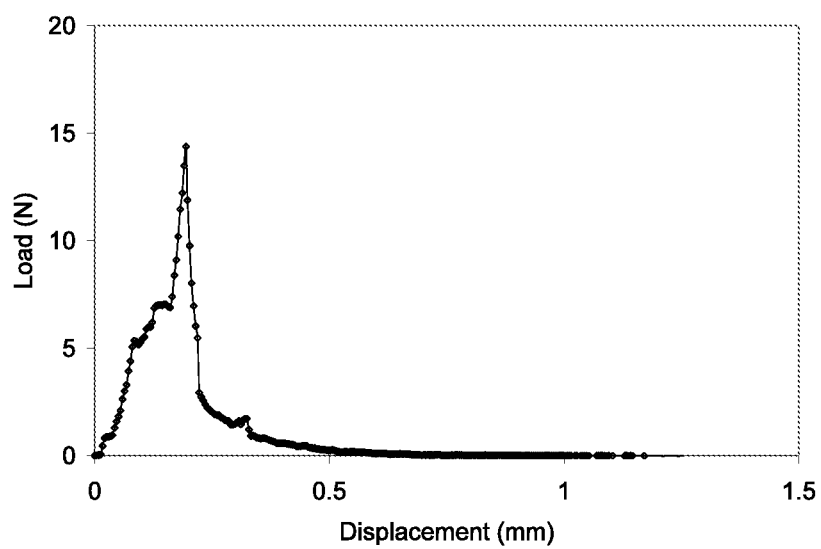
FIG. 3 is a graph of the load displacement curve for a honeycomb structure in accordance with this invention on a four point bend test.
Figure 4:
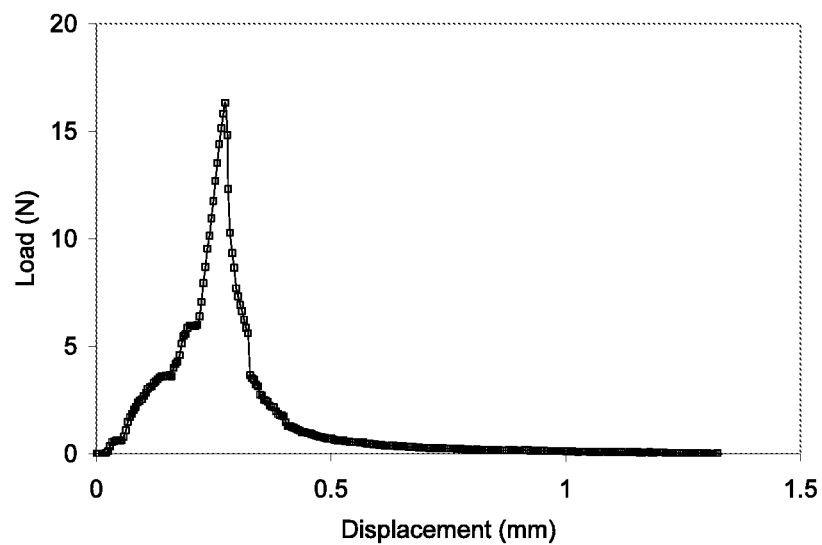
FIG. 4 is a graph of the load displacement curve for a comparative honeycomb structure on a four point bend test.

FIGS. 3 and 4 show that Example 1 performs approximately equally to Comparative Sample A in the 4-point bend test, despite a much lower fiber content.

Comparative Sample C is prepared in the same manner as described with respect to Example 1. The cement composition in this case is 10 parts by weight of an unchopped aluminum zirconium silicate fiber (Fiberfrax Long Staple Fine Fiber, available from Unifrax LLC, length >50 mm, diameter 4-8 microns), 20 parts of colloidal alumina (AL20SD, available from Nyacol Nano Technologies, Inc., Ashland, Mass.), 62 parts of water, 4.0 parts of methyl cellulose and 4.0 parts of a 400 molecular weight polyethylene glycol. The resulting cement mixture contains no short fibers.

Figure 5:
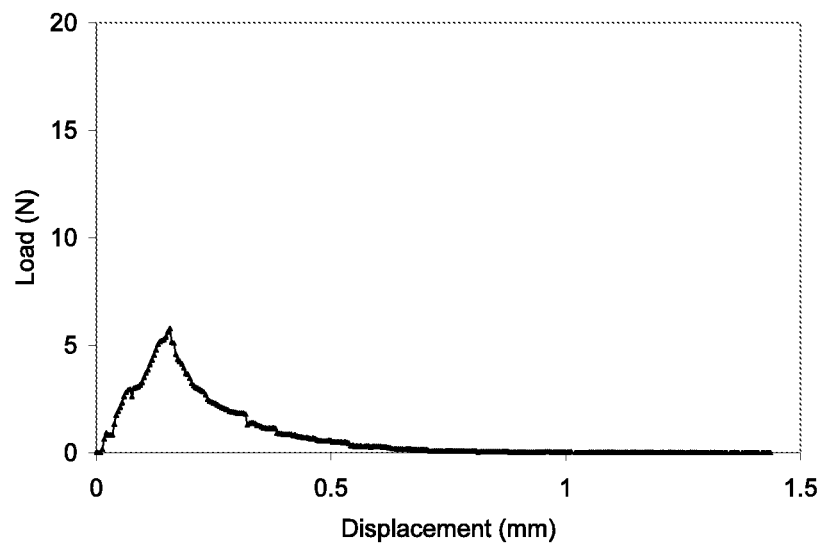
FIG. 5 is a graph of the load displacement curve for a comparative honeycomb structure on a four point bend test.

The viscosity of the cement composition is similar to that of Example 1, despite the lower overall loading of fibers. Cement bars made from this composition are evaluated on the 4-point bend test. Results are shown graphically in FIG. 5. This cement composition has much lower strength than does Example 1, as can be seen by comparing FIG. 5 with FIG. 3.

EXAMPLE 2 AND COMPARATIVE SAMPLES D AND E

A cement composition is prepared as described in Example 1. 4 parts by weight of an chopped magnesium silicate fiber (Isofrax, available from Unifrax LLC, length 1-50 mm, diameter 3-4.5 microns), 26 parts of a ball milled magnesium silicate fiber (Isofrax, available from Unifrax LLC, length 100-500 microns, diameter 3-4.5 microns), 16 parts of colloidal alumina (AL20SD, available from Nyacol Nano Technologies, Inc., Ashland, Mass.), 48 parts of water, 3 parts of methyl cellulose and 3 parts of a 400 molecular weight polyethylene glycol are mixed until uniform. The viscosity of the mixture is measured at different rotational speeds using a Brookfield Model RVDV-I Prime viscometer with a No. 6 disc spindle at room temperature. Results are indicated as reference numeral 2 in FIG. 6.

Comparative Sample D is prepared in the same manner. The cement composition in this case is 42 parts of the ball milled magnesium silicate fiber (Isofrax, available from Unifrax LLC, length 100-500 microns, diameter 3-4.5 microns), 13 parts of colloidal alumina (AL20SD, available from Nyacol Nano Technologies, Inc., Ashland, Mass.), 40 parts of water, 2.5 parts of methyl cellulose and 2.5 parts of a 400 molecular weight polyethylene glycol. The resulting cement composition contains no long fibers. The viscosity of the cement composition is measured in the same manner as for Example 1. Results are indicated by reference numeral D in FIG. 6.

Figure 6:
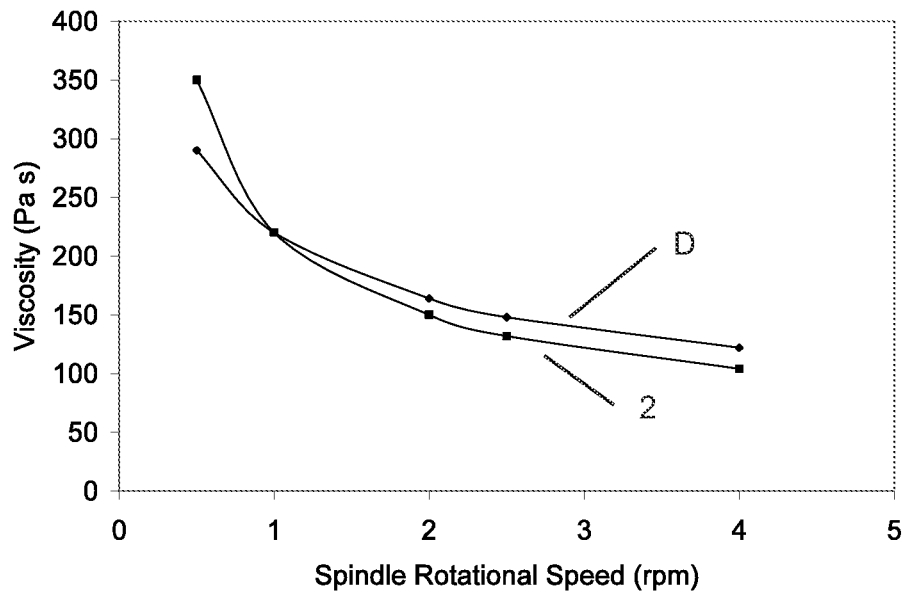
FIG. 6 is graph showing the viscosities of a cement of the invention and of a comparative cement composition, over a range of spindle rotational speeds.

As can be seen in FIG. 6, the viscosity of Example 2 is approximately the same as that of Comparative Sample D, despite having a much lower total fiber content (30% vs. 42%).

Figure 7:
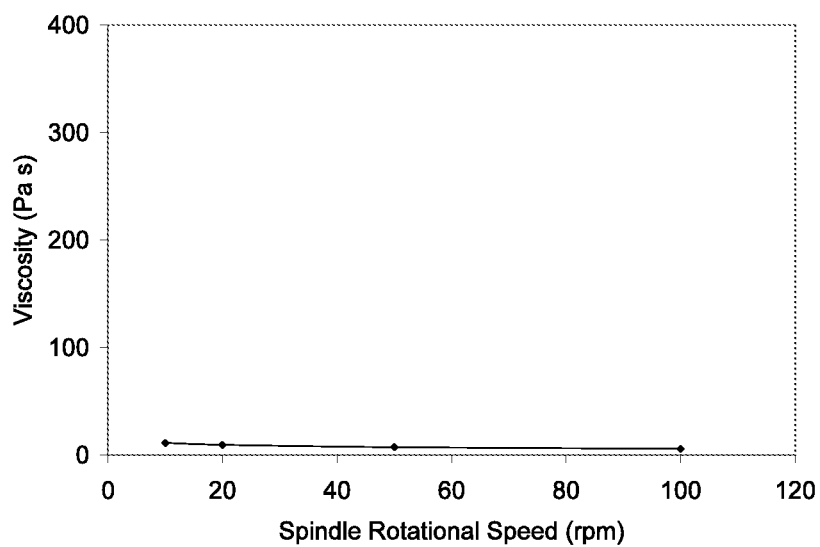
FIG. 7 is graph showing the viscosity of a comparative cement composition, over a range of spindle rotational speeds.

Comparative Sample E is prepared in the same manner as described with respect to Example 1. The cement composition in this case is 27 parts of the ball milled magnesium silicate fiber (Isofrax, available from Unifrax LLC, length 100-500 microns, diameter 3-4.5 microns), 17 parts of colloidal alumina (AL20SD, available from Nyacol Nano Technologies, Inc., Ashland, Mass.), 50 parts of water, 3.0 parts of methyl cellulose and 3.0 parts of a 400 molecular weight polyethylene glycol. The resulting cement composition contains no long fibers. The amount of short fibers is approximately the same as in Example 1. The viscosity of this cement composition is measured in the same manner as for Example 1. Results are indicated graphically in FIG. 7. The viscosity of this cement composition is approximately an order of magnitude lower than that of Example 2 and Comparative Sample D, again illustrating that large fiber loadings are needed to obtain a workable cement viscosity using only the shorter fibers.

What is claimed is:

1. A method of forming a honeycomb structure comprising contacting a first honeycomb segment on at least one of its outer surfaces with a cement composition comprised of inorganic fibers, a carrier fluid and a colloidal inorganic sol, wherein the fibers constitute at least about 10% by weight of the solids of the cement composition and the fibers have a multi-modal length distribution such that a portion of the fibers have lengths of at least 10 microns up to 1000 microns, and at least one other portion of the fibers are longer fibers having lengths of greater than 1 millimeter, wherein the longer fibers constitute from 3 to 30 percent of the total weight of the inorganic fibers, mechanically contacting a second honeycomb segment with the first honeycomb segment such that the cement composition is interposed between said honeycomb segments such that said honeycomb segments are adhered, firing the adhered segments sufficiently to convert the colloid to a binding phase that bonds the fibers of the cement together and bonds the cement to the honeycomb segments to form the honeycomb structure.

2. The method of claim 1 wherein the fibers constitute from 30 to 85% of the weight of the solids of the cement composition.

3. The method of claim 2 wherein the colloidal inorganic sol constitutes from 15 to 50% by weight of the solids of the cement composition.

4. The method of claim 1 wherein the longer fibers constitute from 5 to 25 percent of the total weight of the inorganic fibers.

5. The method of claim 2 wherein the cement composition further comprises a shot material contained in the fibers.

6. The method of claim 2, wherein the cement composition is devoid of any other inorganic particles having an aspect ratio of less than 10.

7. The method of claim 2, wherein the fibers are amorphous alumino-silicate fibers.

8. The method of claim 2, wherein the fibers are comprised of an alkaline earth silicate.

9. The method structure of claim 6, wherein the alkaline earth is Mg.

10. The method of claim 2, wherein the honeycombs are comprised of acicular mullite.

11. A ceramic honeycomb structure comprised of at least two separate smaller ceramic honeycombs that have been adhered together by the method of claim 1.

12. A cement composition comprising inorganic fibers, a carrier fluid and a colloidal inorganic sol, wherein the fibers constitute at least 10% of the weight of the solids of the cement and the fibers have a multi-modal length distribution wherein a portion of the fibers have lengths of at least 10 microns up to 1000 microns, and at least one other portion of the fibers are longer fibers having lengths greater than 1 millimeter, wherein the longer fibers constitute from 3 to 30 percent of the total weight of the inorganic fibers.

* * * * *